US012759142B2

(12) United States Patent
Okumura et al.

(10) Patent No.: US 12,759,142 B2
(45) Date of Patent: Oct. 13, 2026

(54) CONTROL METHOD FOR ROBOT AND ROBOT CONTROL DEVICE

(71) Applicant: NIDEC INSTRUMENTS CORPORATION, Nagano (JP)

(72) Inventors: Hirokatsu Okumura, Nagano (JP); Takahiro Shiraki, Nagano (JP)

(73) Assignee: NIDEC INSTRUMENTS CORPORATION, Nagano (JP)

( * ) Notice: Subject to any disclaimer, the term of this patent is extended or adjusted under 35 U.S.C. 154(b) by 278 days.

(21) Appl. No.: 18/423,295

(22) Filed: Jan. 26, 2024

(65) Prior Publication Data

US 2024/0253225 A1 Aug. 1, 2024

(30) Foreign Application Priority Data

Jan. 31, 2023 (JP) ................................ 2023-012774

(51) Int. Cl.

*B25J 9/12* (2006.01)
*B25J 9/10* (2006.01)
*B25J 9/16* (2006.01)
*B25J 9/06* (2006.01)

(52) U.S. Cl.

CPC ................ *B25J 9/126* (2013.01); *B25J 9/10* (2013.01); *B25J 9/1651* (2013.01); *B25J 9/1653* (2013.01); *B25J 9/1664* (2013.01); *B25J 9/1674* (2013.01); *B25J 9/06* (2013.01)

(58) Field of Classification Search

CPC ....... B25J 9/06; B25J 9/10; B25J 9/126; B25J 9/1651; B25J 9/1653; B25J 9/1664; B25J 9/1674

See application file for complete search history.

(56) References Cited

U.S. PATENT DOCUMENTS

| | | | | |
|---|---|---|---|---|
| 2003/0083783 | A1* | 5/2003 | Matsuo | G05B 19/19 700/245 |
| 2005/0204850 | A1* | 9/2005 | Nihei | B25J 9/102 74/490.01 |
| 2012/0035763 | A1* | 2/2012 | Motoyoshi | B25J 9/1694 700/258 |
| 2013/0338827 | A1* | 12/2013 | One | G05B 19/423 901/41 |
| 2018/0012789 | A1* | 1/2018 | Handa | B25J 9/042 |
| 2019/0134814 | A1* | 5/2019 | Inomata | B25J 9/042 |
| 2024/0092590 | A1* | 3/2024 | Okumura | B25J 9/1664 |
| 2025/0196337 | A1* | 6/2025 | Okamoto | B25J 9/044 |

FOREIGN PATENT DOCUMENTS

| | | |
|---|---|---|
| JP | 2015199149 | 11/2015 |
| JP | 2015199149 A * | 11/2015 |
| WO | 2017175340 | 10/2017 |

* cited by examiner

*Primary Examiner* — Dale Moyer
(74) *Attorney, Agent, or Firm* — JCIPRNET

(57) ABSTRACT

For each axis of a robot, a resonance avoidance speed range is determined in advance based on a natural vibration frequency or the like of the robot. When an operation plan of the robot is created based on an operation command (step 101), a maximum speed of a motor in the operation plan is acquired (step 102), whether or not the maximum speed is included in a resonance avoidance speed range is determined (step 103), and when it is included, the operation plan is recreated such that the maximum speed is equal to or lower than a lower limit speed of the resonance avoidance speed range (step 104).

8 Claims, 7 Drawing Sheets

CONTROL METHOD FOR ROBOT AND ROBOT CONTROL DEVICE

CROSS REFERENCE TO RELATED APPLICATION

The present invention claims priority under 35 U.S.C. § 119 to Japanese Application No. 2023-012774 filed Jan. 31, 2023, the entire content of which is incorporated herein by reference.

BACKGROUND

Field of the Invention

At least an embodiment of the present invention relates to a control method that controls an operation of a robot and a robot control device that executes such a control method.

Description of the Related Documents

A robot used for conveying or processing a workpiece generally has a configuration in which a plurality of arms (also referred to as links) are coupled in series to a base and an end effector such as a hand is provided at a distal end, and is controlled so as to move the end effector to a designated position. When the robot is operated by designating a target position of the end effector, it is preferable to be able to reach the target position in as short a time as possible within a range of a rated speed of a motor that drives each axis of the robot, for example. However, due to the structure in which the plurality of arms are coupled in series and one end of the arms is connected to the base, resonance may occur in the robot accompanying with the operation of the robot. When resonance occurs, the distal end of the robot, i.e., the position of the end effector, also vibrates, which makes accurate positioning of the end effector difficult. That is, it is difficult to accurately control the robot.

A conveying robot is used in order to convey a workpiece such as a semiconductor wafer between a cassette that stores workpieces and a workpiece processing device that performs processing on workpieces. In the following description, an object from which a workpiece is taken out (i.e., loaded) and to which the workpiece is discharged (i.e., unloaded) by a robot is collectively referred to as a stage. Both a cassette used for storing wafers in a semiconductor manufacturing process and a workpiece processing device that performs some processing on wafers are stages. In the semiconductor manufacturing process, a conveying robot is disposed in a work area defined by a wall surface, a plurality of stages are arranged on the wall surface surrounding the work area, and a semiconductor wafer, which is a workpiece, is conveyed between the stages by the robot. Since the conveying robot is required to be able to load/unload a workpiece with respect to a plurality of stages, a horizontal articulated robot is used as the robot, in which a plurality of arms are rotatably coupled to each other, and a rotational force of a motor or the like is transmitted to the arms to perform operations such as rotation and expansion/contraction. The arm at the most distal end is rotatably equipped with a hand on which a workpiece is actually mounted at the time of conveyance as an end effector. When resonance occurs in such a horizontal articulated robot for conveyance, the hand wobbles, which causes problems such as inability to unload the workpiece to an appropriate position on the stage, failure to load the workpiece, shaking down the workpiece during movement, and collision of the workpiece on the hand with a wall surface of the stage or a wall surface of a space surrounding the robot.

As a technique for suppressing the occurrence of resonance when a robot is operated, WO 2017/175340 discloses that target position information of respective joints is derived based on a command to the robot, vibration of the distal end of the robot is obtained by numerical calculation from a dynamic characteristic model of the robot, control for the robot, and the target position information of the respective joints, and when the obtained vibration exceeds an allowable value, the speed of the robot is reduced. Further, JP 2015-199149A discloses that a force sensor is attached to a robot, the presence or absence of occurrence of resonance is determined from vibrations detected by the force sensor during operation of the robot, a natural vibration frequency of the robot is obtained when resonance is detected, vibration frequencies of respective joints are obtained from outputs of encoders of respective axes, the natural vibration frequency and the vibration frequency of each of the joints are compared to specify the joint causing resonance, and the number of rotations of the motor for the axis corresponding to the joint is changed.

In the technique described in WO 2017/175340, since the magnitude of vibration is calculated using the dynamic characteristics model, there is a problem in that the amount of calculation required to suppress the occurrence of vibration in the robot is large. In addition, in the technique described in JP 2015-199149A, the robot is required to be equipped with a force sensor, and there is a problem in that it is difficult to apply the technique to a robot which is not provided with a force sensor. Further, the techniques described in WO 2017/175340 and JP 2015-199149A both suppress the occurrence of resonance in a vertical articulated robot, but in a horizontal articulated robot, since there is no movement of a link in the elevation angle direction, the vibration form (vibration mode) of resonance is also different, and therefore, even if a method of suppressing resonance in a vertical articulated robot is applied to control a horizontal articulated robot, the control is not necessarily optimum.

An object of at least an embodiment of the present invention is to provide a control method for a robot capable of suppressing the occurrence of resonance in a horizontal articulated robot with a small amount of calculation, and a robot control device that executes such a control method.

SUMMARY

According to an aspect of the present invention, there is provided a control method of creating an operation plan of a robot which is a horizontal articulated robot, based on an operation command to the robot, thereby controlling a motor of each of axes of the robot, the control method includes executing, when a maximum speed of at least one axis driven by the motor in the robot in the operation plan is included in a resonance avoidance speed range obtained in advance for the axis, resonance avoidance processing of recreating the operation plan such that the maximum speed is equal to or lower than a lower limit speed of the resonance avoidance speed range.

The resonance in the robot occurs when the vibration that occurs when the motor drives the axis is close to the natural vibration frequency of the robot. The frequency of the vibration when the motor drives the axis is proportional to the rotational speed of the motor. In an aspect of the control method, the resonance avoidance speed range including the natural vibration frequency of the robot is set in advance for each axis, and when the highest speed of the axis in the operation plan is within the resonance avoidance speed range, the operation plan is recreated such that the highest speed is out of the resonance avoidance speed range. Thus, it is possible to suppress the occurrence of resonance in the robot with a small amount of calculation.

In an aspect of the control method, the robot includes a coupled body in which a plurality of arms are coupled in series, a base to which the coupled body is connected at one end of the coupled body, and a hand attached to an other end of the coupled body, and the resonance avoidance processing is executed on an axis, among the axes, which is at a position where the base and the coupled body are connected. Since the resonance caused by the axis at the position where the base and the coupled body are connected to each other generally has a larger amplitude than the resonance caused by the other axes, the occurrence of the resonance in the robot can be effectively suppressed by executing the resonance avoidance processing on the axis at the position where the base and the coupled body are connected to each other.

In an aspect of the control method, in the robot, a number of degrees of freedom of the coupled body in a horizontal plane is two, and in this case, a highest speed of each of the axes is reduced when the operation plan is recreated. By recreating the operation plan in this way, it is possible to reduce the amount of calculation required for recreating the operation plan. In this case, the operation plan may be an operation plan based on a point-to-point operation in which timings of acceleration start, acceleration end, deceleration start, and deceleration end coincide in all the axes of the robot. By using such an operation plan, it is possible to easily control the robot by the point-to-point operation while suppressing the occurrence of resonance.

In an aspect of the control method, in the robot, the number of degrees of freedom of the coupled body in the horizontal plane is, for example, three or more, the operation plan is a control plan based on a linear interpolation operation, and an operation plan in which an overall speed is maintained can be created when the operation plan is recreated. Since the number of degrees of freedom necessary for specifying the position in the horizontal plane is two, it is possible to suppress the occurrence of the resonance without extending the time to completion of the movement by utilizing the redundant degree of freedom due to having three or more degrees of freedom. As an example, the plurality of arms include a first arm rotatably connected to the base, a second arm rotatably connected to the first arm, and a third arm rotatably connected to the second arm and rotatably holding the hand. In this case, wherein a position where the first arm is connected to the base is set as an origin, a position where the second arm is connected to the first arm is set as a first joint point, a position where the third arm is connected to the second arm is set as a second joint point, and a position where the hand is connected to the third arm is set as a third joint point, and that the second joint point exists on a virtual travel axis passing through the origin in a horizontal plane, and an angle formed by a reference direction extending horizontally through the origin and the virtual travel axis is set as a virtual travel axis angle, an operation plan for changing the virtual travel axis angle during movement can be created when the operation plan is regenerated. By introducing the concept of the virtual travel axis angle, it is possible to simplify the processing when controlling the posture of the robot, thereby making it possible to suppress the occurrence of resonance with a smaller amount of calculation.

According to another aspect of the present invention, there is provided a robot control device that creates an operation plan of a robot which is a horizontal articulated robot, based on an operation command to the robot, thereby controlling a motor of each of axes of the robot, and the robot control device recreates, when a maximum speed of at least one axis driven by the motor in the robot in the operation plan is included in a resonance avoidance speed range obtained in advance for the axis, the operation plan such that the maximum speed is equal to or lower than a lower limit speed of the resonance avoidance speed range.

In such a robot control device, when the highest speed of the axis in the operation plan is within the resonance avoidance speed range obtained in advance for the axis corresponding to the natural vibration frequency of the robot, the operation plan is recreated such that the highest speed is out of the resonance avoidance speed range, and thus it is possible to suppress the occurrence of resonance in the robot with a small amount of calculation.

According to at least an embodiment of the present invention, it is possible to easily suppress the occurrence of resonance in a horizontal articulated robot.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

Figure 1A:
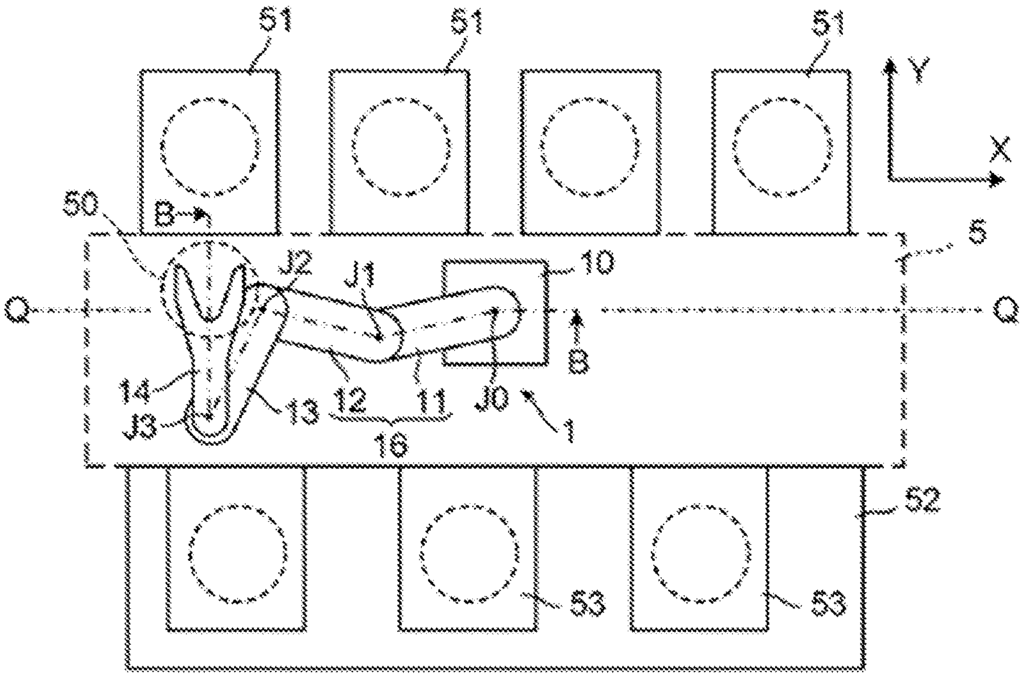
FIGS. 1A and 1B are a plan view and a schematic sectional view illustrating a robot, respectively.
Figure 1B:
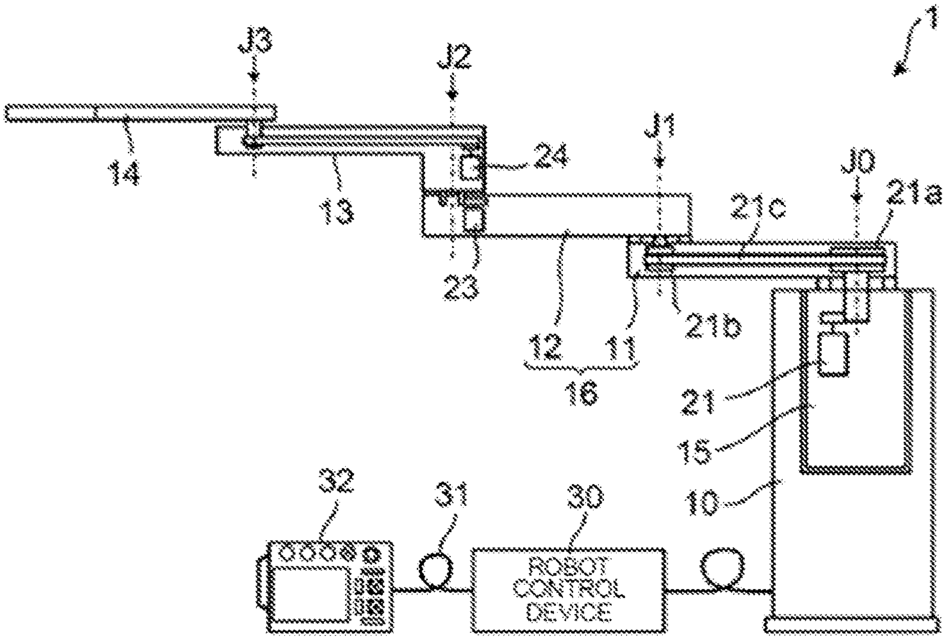

Hereinafter, at least an embodiment of the present invention will be described with reference to the drawings. FIGS. 1A and 1B illustrate a robot to which a control method according to an embodiment of the present invention is applied, FIG. 1A is a plan view, and FIG. 1B is a sectional view taken along line B-B of FIG. 1A. A robot 1 illustrated in the figure is a horizontal articulated robot, is disposed in a work area 5, and is used to convey, for example, a disk-shaped workpiece 50 between stages provided on a wall surface surrounding the work area 5. In the following description, it is assumed that the workpiece 50 is a semiconductor wafer, but the workpiece 50 is not limited to a semiconductor wafer, and the horizontal articulated robot to which at least an embodiment of the present invention is applied is not limited to a conveying robot.

The work area 5 is an elongated rectangular space, and on the wall surface along one long side of the work area 5, a plurality of cassettes 51 for accommodating wafers as workpieces 50 are arranged along the longitudinal direction of the work area 5. A workpiece processing device 52 that performs a process on the workpiece 50 is provided on the other long side of the work area 5, and a plurality of load lock chambers 53 for transporting the workpiece 50 to and from the robot 1 are provided in the workpiece processing device 52. These load lock chambers 53 are also arranged along the longitudinal direction of the work area 5 on the wall surface that defines the work area 5. Both the cassettes 51 and the load lock chambers 53 are places where the robot 1 loads and unloads the workpiece 50, and are collectively referred to as stages as described above. The work area 5 is a space in which the robot 1 can move its hand, arm, or the like without interfering with the wall surface or the like when the workpiece 50 is conveyed between the stages.

Next, a detailed configuration of the robot 1 will be described. The robot 1 includes a base 10 disposed and fixed on a floor surface of the work area 5, three arms coupled in series to the base 10, that is, a first arm 11, a second arm 12, and a third arm 13, and a hand 14 attached to the third arm 13. Three coupled arms 11 to 13 constitute a coupled body. The base 10 includes an elevating and lowering cylinder 15 that is driven by an elevating and lowering motor (not illustrated) to elevate and lower in the vertical direction. The arms 11 to 13 and the hand 14 each have a proximal end portion and a distal end portion, and the proximal end portion of the first arm 11 is rotatably coupled to the elevating and lowering cylinder 15, so that the first arm 11 is held by the base 10. The first arm 11 can elevate and lower with respect to the base 10 accompanying the elevating and lowering of the elevating and lowering cylinder 15. Although the arms 11 to 13 and the hand 14 are integrally elevated and lowered by the elevating and lowering of the elevating and lowering cylinder 15, the present embodiment describes the control of the movement of the horizontal articulated robot 1 in the horizontal plane, and the movement in the height direction by the elevating and lowering cylinder 15 is small compared to the movement of the arms 11 to 13 and the hand 14 in the horizontal plane. Therefore, in the following description, the movement of the robot 1 in the height direction by the elevating and lowering cylinder 15 is assumed to be able to be ignored.

The first arm 11 is driven by a motor 21 built in the elevating and lowering cylinder 15 to rotate in a horizontal plane, and the proximal end portion of the second arm 12 is rotatably coupled to the distal end portion of the first arm 11. The first arm 11 builds in a first pulley 21*a* connected to the motor 21, a second pulley 21*b* coupled to the second arm 12, and a belt 21*c* bridged between the first pulley 21*a* and the second pulley 21*b*. The ratio of the diameters of the first pulley 21*a* and the second pulley 21*b* is 2:1, and when the first arm 11 rotates about the rotation center of the first pulley 21*a*, the rotation angle ratio between the first pulley 21*a* and the second pulley 21*b*, that is, the rotation angle ratio between the first arm 11 and the second arm 12 is 1:2. The first arm 11 and the second arm 12 are equal in length. In this way, in the robot 1 illustrated in FIGS. 1A and 1B, a link mechanism 16 in which the second arm 12 also moves accompanying with the rotation of the first arm 11 is configured. Here, the position of the rotation center of the first arm 11 with respect to the base 10 (i.e., the rotation center of the first pulley 21*a*) is defined as a joint point J0, and the position of the rotation center of the second arm 12 with respect to the first arm 11 is defined as a joint point J1.

The proximal end portion of the third arm 13 is rotatably held by the distal end portion of the second arm 12, and the third arm 13 is driven by a motor 23 built in the second arm 12 to rotate in the horizontal plane. The proximal end portion of the hand 14 is rotatably held by the distal end portion of the third arm 13, and the hand 14 is driven by a motor 24 built in the third arm 13 to rotate in the horizontal plane. A distal end portion side of the hand 14 is branched into a fork shape such that the workpiece 50 can be placed thereon. The position of the rotation center of the third arm 13 with respect to the second arm 12 is defined as a joint point J2, and the position of the rotation center of the hand 14 with respect to the third arm 13 is defined as a joint point J3.

In the robot 1 illustrated in FIGS. 1A and 1B, since the link mechanism 16 is provided, the movement locus of the center point of a coupling shaft that rotatably couples the second arm 12 and the third arm 13, that is, the joint point J2, is restricted to a predetermined straight line. In the figure, this predetermined straight line is indicated by a straight line Q. The robot 1 is disposed in the work area 5 so that the straight line Q extends along the longitudinal direction of the work area 5 having an elongated rectangular shape. In the robot 1, the arms 11 to 13 and the hand 14 are rotated in a horizontal plane by driving the motors 21, 23, and 24. Therefore, in order to describe the operation of the robot 1, XY coordinates are set in the horizontal plane. The X-axis direction is the direction serving as a reference of the operation of the robot 1, and the Y-axis direction is orthogonal to the X-axis direction. In the example illustrated, the X-axis direction is the longitudinal direction of the work area 5 and coincides with the direction in which the stages arranged on the wall surface surrounding the work area 5 are aligned. Therefore, the straight line Q extends in the X direction. As illustrated in the figure, a robot control device 30 that controls the robot 1 is connected to the robot 1, and a pendant 32 can be connected to the robot control device 30 via a cable 31 in order to perform teaching of the robot 1. The robot control device 30 can drive and control each motor (e.g., the motors 21, 23, and 24 and the elevating and lowering motor (not illustrated)) in the robot 1 based on an operation command input from outside or a command by teaching using the pendant 32.

Next, control of the robot 1 in the present embodiment will be described. Since the robot 1 conveys the workpiece 50 between the stages, the operation command input to the robot control device 30 for operating the robot 1 is a command for designating a position of the robot 1, particularly a position of the hand 14 (or a position of the joint point J3 as will be described later) and operating the robot 1. The robot control device 30 creates an operation plan including a robot trajectory when the robot 1 is operated based on the positions of the robot 1 before and after the movement according to the operation command, and drives the motors 21, 23, and 24 of the robot 1 based on the operation plan. At this time, as well known, there are a point-to-point (PTP) operation and a continuous path (CP) operation as operation modes when a target position is designated and the robot 1 is operated. In general, the PTP operation is an operation of designating only a start point and an end point of a trajectory to be taken by a distal end of a tool or a hand attached to a robot and moving the tool or the hand. In general, the CP operation is an operation of designating a path which is a straight line (or a curved line in some cases) in a three dimensional space and moving the distal end of the tool or the hand along the path. In the PTP operation, a start point and an end point are designated, but a path of the robot between the start point and the end point is not designated. In particular, in a robot having two or more axes, after it is determined for each axis how much the axis should move between the start point and the end point, each axis is independently moved by a movement amount for each axis. On the other hand, the CP operation controls each axis at each moment so as not to deviate from a designated path, and is used, for example, when movement between teaching points indicated by teaching data is interpolated by a straight line. Although the robot can be moved at a higher speed in the PTP operation than in the CP operation, since the path of the robot is not designated, interference with a wall surface or the like around the robot is likely to occur in the PTP operation. On the other hand, in the CP operation, since the path of the robot can be designated, the interference with the wall surface or the like can be reliably prevented although the speed is lower than that of the PTP operation.

It is assumed that, for each stage which is the cassette 51 or the load lock chamber 53, a position (referred to as a standby position) which directly faces the stage and at which the robot 1 accesses the inside of the stage by the hand 14 is determined in the work area 5. When the workpiece 50 is conveyed between the stages by the robot 1, a linear interpolation operation which is one of the CP operations is used for the movement between the inside of the stage and the standby position corresponding to the stage, and the PTP operation is used for the movement between the standby positions in the work area 5, whereby the workpiece 50 can be conveyed in a shorter time while preventing the collision with the wall surface or the like.

When the robot 1 is operated at a high speed, if the frequency of vibration occurring in the robot 1 by driving the motor of each axis is close to the natural vibration frequency of the robot 1, the robot 1 may resonate and vibrate greatly. For example, when the frequency of vibration occurring from driving a motor of a certain axis is close to the natural vibration frequency of the robot 1 with the axis as a node of vibration, the robot 1 resonates. Therefore, the natural vibration frequency of the robot 1 exists for each axis that serves a node of vibration. Strictly speaking, the natural vibration frequency may change depending on the posture of the robot 1. However, in the present embodiment, the robot 1 is a horizontal articulated robot, and changes in the natural vibration frequency due to changes in posture may be considered small. The vibration occurring from driving a motor is caused by, for example, an angular transmission error in a speed reducer attached to the motor, and the frequency of the vibration is proportional to the rotational speed of the motor.

Therefore, in the present embodiment, with respect to the speed of the motor for each axis of the robot 1, a speed range in which resonance is considered to be likely to occur in the axis is obtained in advance, and the speed range is defined as a resonance avoidance speed range. A speed serving as an upper limit (upper limit speed) of the resonance avoidance speed range is denoted by UL, and a speed serving as a lower limit (lower limit speed) is denoted by LL. Then, when the maximum speed of the motor of a certain axis is within the resonance avoidance speed range of the axis in the original operation plan created based on the operation command to the robot 1, the operation plan is recreated such that the maximum speed becomes equal to or lower than the lower limit speed LL of the resonance avoidance speed range. That is, when the maximum speed in the original operation plan is defined as V0 and the maximum speed in the recreated operation plan is defined as V1, the recreation of the operation plan is performed so as to be V1≤LL when LL≤V0≤UL. Actually, when V0=LL in the original operation plan, the maximum speed can be left unchanged, and therefore, when a determination is made on whether a maximum speed V0 in the operation plan is within the resonance avoidance speed range, it may be sufficient to determine whether LL<V0≤UL is satisfied. The upper limit speed UL may also be determined to be outside the resonance avoidance speed range when V0=UL. The resonance avoidance speed range may be determined based on the speed of the motor when the amplitude is large by actually operating the robot 1 while changing the speed of the motor and obtaining the amplitude of the vibration occurring in the robot 1, or may be determined based on the natural vibration frequency, which is determined by simulation based on the moment of inertia of the robot 1 and the values of the spring components in each axis. Since it is considered that the resonance in the robot 1 occurs regardless of the rotation direction of the motor, the speeds (the upper limit speed UL and the lower limit speed LL) defining the resonance avoidance speed range are represented as speeds in absolute values regardless of the rotation direction of the motor. Therefore, the highest speed in the operation plan is also represented as a speed in an absolute value.

Figure 2:
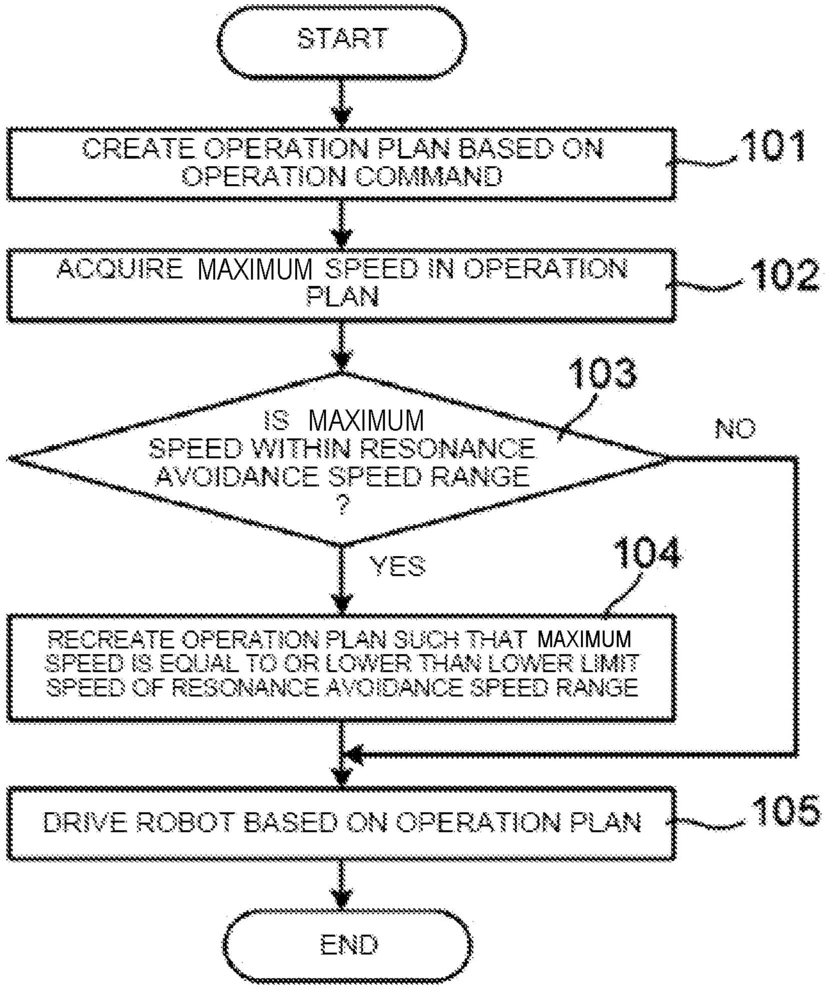
FIG. 2 is a flowchart for explaining a control method for the robot.

FIG. 2 is a flowchart for explaining control executed by the robot control device 30 in order to suppress the occurrence of resonance in the robot 1 when the robot 1 is driven based on an operation command. First, in step 101, the robot control device 30 creates an operation plan that defines a trajectory and the like of the robot based on an input operation command. In particular, the operation plan includes information on how to change the motor speed of each axis when moving from the position before the movement to the target position. After creating the operation plan, the robot control device 30 acquires the maximum speed V0 of the motor speed in the operation plan in step 102, and determines whether or not the maximum speed V0 is within the resonance avoidance speed range in step 103. When the maximum speed V0 is within the resonance avoidance speed range, the robot control device 30 recreates the operation plan such that a maximum speed V1 is equal to or lower than the lower limit speed LL of the resonance avoidance speed range in step 104, and drives the robot 1 based on the recreated operation plan in step 105. On the other hand, when it is determined in step 103 that the maximum speed V0 is outside the resonance avoidance speed range, the robot control device 30 executes step 105 as it is, and drives the robot 1 based on the operation plan created in step 101 as it is.

The resonance avoidance processing, that is, the processing of steps 102 to 104 illustrated in FIG. 2 is performed on at least one of the axes driven by the motors in the robot 1. When the resonance avoidance processing is executed on a robot having a plurality of axes, there is a possibility that, although the maximum speed in the operation plan is outside the resonance avoidance speed range before the recreation of the operation plan, an axis whose maximum speed is within the resonance avoidance speed range may appear in the operation plan after the recreation. In the recreation of the operation plan, the operation plan is recreated in a direction to lower the maximum speed of each axis, and thereby the adverse effects due to resonance in the robot 1 are less likely to occur. Therefore, as a result of the recreation of the operation plan, in a case where an axis whose maximum speed is within the vibration avoidance speed range newly appears, the operation plan may not be recreated over and over again.

In a case where the resonance avoidance processing is executed on only some of the plurality of axes of the robot 1, it is preferable to execute the resonance avoidance processing on the axis relatively closer to the base 10 from the viewpoint of reducing the amplitude of the vibration of the distal end of the hand 14, that is, a hand tip. In particular, since the axis represented by the joint point J0, i.e., the axis driven by the motor 21, has a large moment of inertia around the axis in the robot 1 and tends to generate large amplitude resonance at relatively low vibration frequencies, it is preferable to execute the resonance avoidance processing for the axis driven by the motor 21, i.e., the axis represented by the joint point J0 if the resonance avoidance processing is executed for only one of the plurality of shafts of the robot 1.

Hereinafter, an example of the resonance avoidance processing based on the control method of the present embodiment will be described. Here, it is assumed that the robot 1 is operated by the PTP operation, and at this time, the operation plan is also created as that of the PTP operation. As described above, in the PTP operation, after it is determined for each axis how much the axis should move between the start point and the end point, each axis is independently moved by the movement amount for each axis. Therefore, in order to complete the movement at the highest speed, it is only necessary to accelerate the motor at the allowable maximum acceleration, reach the allowable maximum speed, maintain that speed (i.e., constant speed section), and then decelerate the motor to stop at the allowable maximum deceleration rate. At this time, the speed changes in a trapezoidal shape with respect to time. Depending on the required movement amount, the deceleration may be started before reaching the allowable maximum speed, and in this case, the speed changes in a triangular shape with respect to time. Actually, when the robot 1 having a plurality of axes performs the PTP operation, an operation plan is created such that all the axes start to move simultaneously to start acceleration, the end of acceleration and the start of deceleration also occur simultaneously in all the axes, and all the axes stop (i.e., end the deceleration) simultaneously. In the operation plan created as described above, when the maximum speed of the axis of interest is within the resonance avoidance speed range of the axis, the operation plan is recreated. Also, in the recreated operation plan, the start and end of acceleration simultaneously occur in all the axes, and the start and end of deceleration also simultaneously occur in all the axes.

Figure 3A:
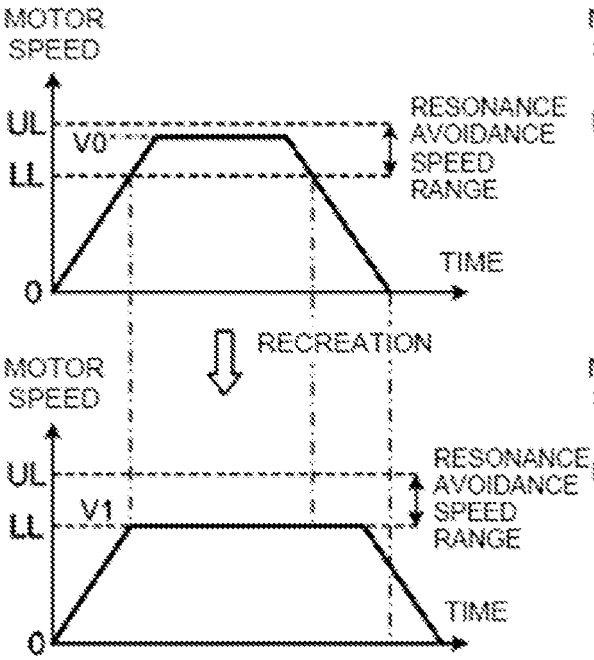
FIGS. 3A and 3B are diagrams each for explaining recreation of an operation plan in a PTP operation.
Figure 3B:
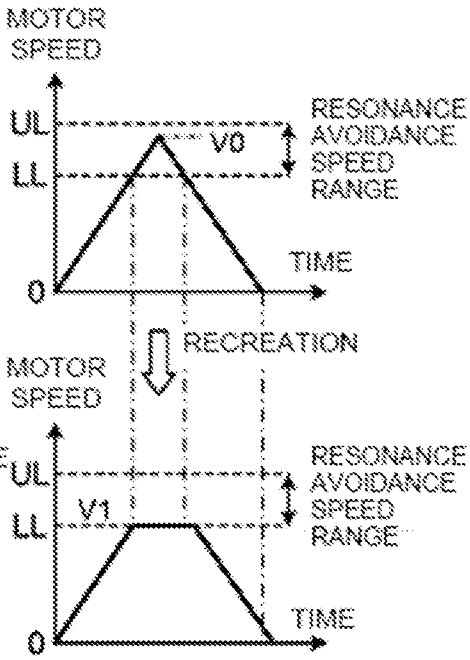

FIGS. 3A and 3B are diagrams each for explaining the recreation of the operation plan in the PTP operation, and illustrates an example of a temporal change in the motor speed of a certain axis in the operation plan created when the PTP operation is performed. FIG. 3A illustrates a case where there is a constant speed section, and the upper graph represents an operation plan generated based on an operation command. A flat portion in the graph is a constant speed section, and the motor speed in the constant speed section is the maximum speed V0 in the operation plan. In this example, since V0 is within the resonance avoidance speed range, the resonance avoidance processing is executed and the operation plan is recreated. The temporal change in the motor speed in the recreated operation plan is illustrated in the lower graph. In the recreated operation plan, the maximum speed V1 is set to the lower limit speed LL of the resonance avoidance speed range. As the maximum speed decreases, the time required to complete the movement becomes longer. Specifically, when the maximum speed V0 in the original operation plan is within the resonance avoidance speed range, the operation plan is regenerated such that the maximum speeds in all the axes in the original operation plan are multiplied by LL/V0, and the timings of acceleration/deceleration and stop coincide in all the axes. FIG. 3B illustrates a case where there is no constant speed section. Here, as illustrated in the upper graph, when the maximum speed V0 of the motor in the operation plan is within the resonance avoidance speed range, the operation plan is recreated such that the maximum speed V1 is equal to or lower than the lower limit speed LL of the resonance avoidance speed range.

Figure 4A:
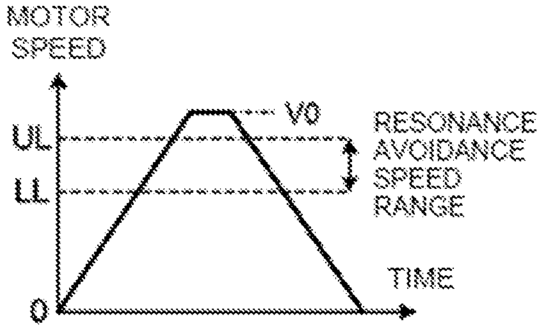
FIGS. 4A and 4B are diagrams each for explaining an operation when the maximum speed is outside a resonance avoidance speed range.
Figure 4B:
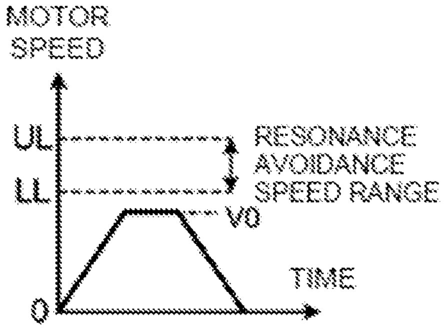

FIGS. 4A and 4B each illustrates a case where the operation plan is not regenerated by illustrating a temporal change in the motor speed in the original operation plan. FIG. 4A illustrates a case where the maximum speed V0 of the motor speed in the operation plan is higher than the upper limit speed UL of the resonance avoidance speed range and is outside the resonance avoidance speed range. In this case, the operation plan is not recreated. FIG. 4B illustrates a case where the maximum speed V0 of the motor speed in the operation plan is lower than the lower limit speed LL of the resonance avoidance speed range and is outside the resonance avoidance speed range. Also in this case, the operation plan is not recreated.

The above describes the resonance avoidance processing when the robot 1 is controlled by the PTP operation, similarly, the resonance avoidance processing can be executed even when the robot 1 is operated by the CP operation, especially by the linear interpolation operation. In the case of the PTP operation, the shape of the change in motor speed for each axis is a trapezoidal shape when the acceleration/deceleration period is included. However, in the case of the linear interpolation operation, the shape of the change in motor speed for each axis is not necessarily a trapezoidal shape, differs for each axis, and may be a complicated shape depending on the axis. Also in the linear interpolation operation, once an operation plan is created, the maximum speed V0 in the operation plan can be obtained for each axis, and by comparing the obtained maximum speed V0 with the resonance avoidance speed range of the axis, an operation plan for suppressing the occurrence of resonance can be recreated. For example, it is possible to simply recreate an operation plan such that the speeds of all the axes in the operation plan are multiplied by LL/V0 when V0≥LL, and instead the speed curve is multiplied by V0/LL along the time axis. However, in the linear interpolation operation, when the operation plan is recreated such that the maximum speed V1 matches the lower limit speed LL of the resonance avoidance speed range, it may be necessary to repeat the creation of the operation plan and the acquisition of the maximum speed depending on the method of recreation.

According to the above-described embodiment, when the maximum speed of at least one axis of the robot 1 in the operation plan is included in the resonance avoidance speed range obtained in advance for the axis, the operation plan is recreated such that the maximum speed is equal to or lower than the lower limit speed of the resonance avoidance speed range, whereby the occurrence of resonance in the robot 1 can be easily suppressed without performing a complicated calculation or the like.

When the robot 1 is used as a conveying robot to access the stage, since the direction of the hand 14 is determined by the access direction to the stage, the robot 1 illustrated in FIGS. 1A and 1B is substantially a robot in which the position of the joint point J3 in the XY coordinate system is controlled, and since the position of the joint point J3 is determined by the rotational positions of the two motors 21 and 23, the robot 1 does not have a redundant degree of freedom. When there is no redundant degree of freedom, an inaccessible region, that is, a dead area may be generated in the work area 5 due to restrictions on the rotatable angular range of each axis, or the movement path between stages may be complicated in order to avoid interference with the wall surface surrounding the work area 5. Thus, a horizontal articulated robot having one additional degree of freedom can be considered, and the control method according to an aspect of the present invention can be applied to such a robot. Hereinafter, as another embodiment of the present invention, a case where the control method according to an aspect of the present invention is applied to a robot having an additional degree of freedom, that is, a redundant degree of freedom will be described.

Figure 5:
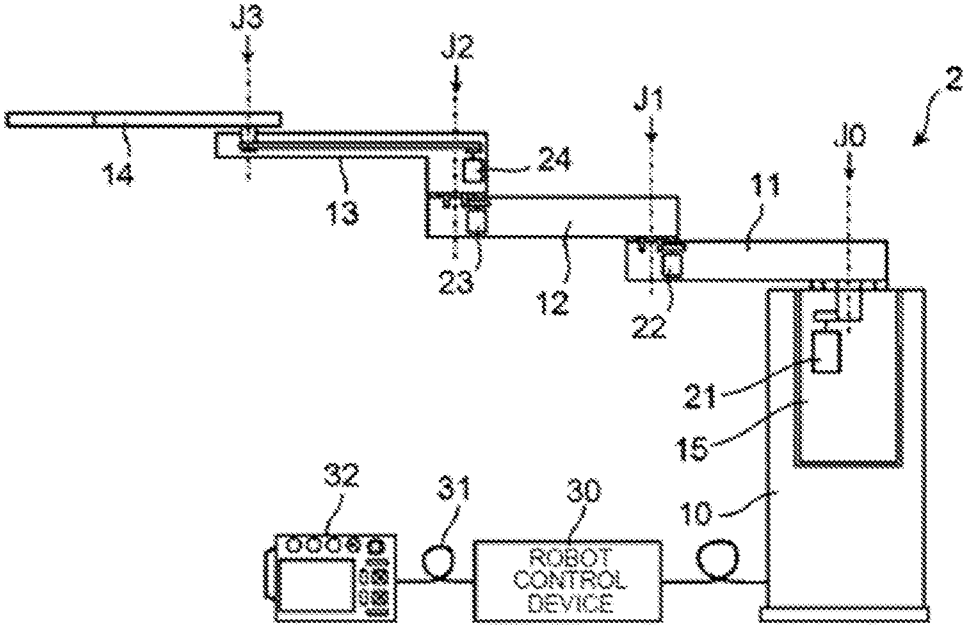
FIG. 5 is a schematic sectional view illustrating a robot used in another embodiment.

A robot 2, which is illustrated in FIG. 5, is a horizontal articulated robot having one additional degree of freedom. In the robot 2, the first pulley 21*a*, the second pulley 21*b*, and the belt 21*c* provided in the first arm 11 in the robot 1 illustrated in FIGS. 1A and 1B are removed, and instead, a motor 22 for rotating the second arm 12 in a horizontal plane is provided in the first arm 11. As a matter of course, the motor 22 is also driven and controlled by the robot control device 30 similarly to the other motors 21, 23, and 24. Since the rotation angle of the second arm 12 with respect to the first arm 11 can be arbitrarily controlled by driving the motor 22 in the robot 2, the movement locus of the joint point J2 is not restricted to the straight line Q extending in the X direction.

Figure 6A:
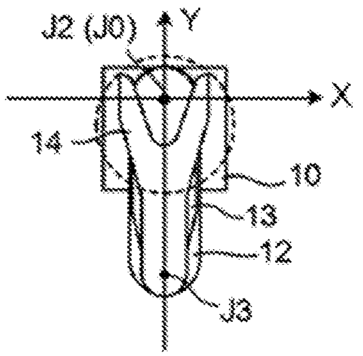
FIGS. 6A, 6B, 6C, 6D, 6E, and 6F are diagrams each for explaining a posture of the robot illustrated in FIG. 5 in a XY coordinate system.

FIGS. 6A, 6B, 6C, 6D, 6E, and 6F are diagrams each for explaining the posture of the robot in the XY coordinate system. The joint point J0 (i.e., the rotation center of the first arm 11 with respect to the base 10) is defined as the origin of the XY coordinate system. FIG. 6A is a plan view illustrating an origin position of the robot 2. In the robot 2, the origin position which is a posture serving as a reference of operation of the robot 2 is determined. At the origin position, the arms 11 to 13 and the hand 14 are folded, and the folded arms and hand extend in the Y-axis direction. Therefore, the joint point J2 overlaps with the joint point J0 which is the origin of the XY coordinate system.

Figure 6B:
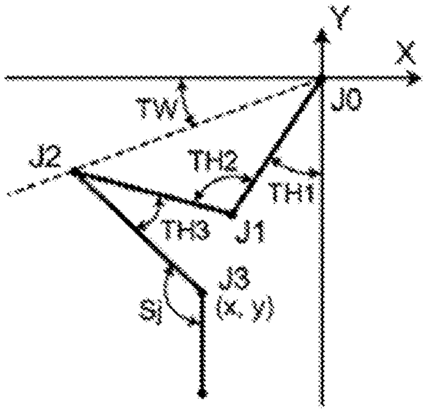

FIG. 6B illustrates a state in which the arms 11 to 13 and the hand 14 are opened in order to access the stage. The rotation angle of the first arm 11 from the origin posture around the joint point J0 is denoted by TH1. That is, the angle TH1 is a joint angle formed by the Y-axis and the first arm 11. Similarly, a joint angle formed by the first arm 11 and the second arm 12 around the joint point J1 is denoted by TH2, a joint angle formed by the second arm 12 and the third arm 13 around the joint point J2 is denoted by TH3, and a joint angle formed by the third arm 13 and the hand 14 around the joint point J3 is denoted by Sj. At the origin position, the angles TH1 to TH3 and Sj are all 0. Herein, the orientation of the hand 14 in the XY coordinate system is generally controlled to coincide with the access direction (i.e., the direction in which loading and unloading are performed) with respect to the stage to be accessed by the hand 14. Therefore, when the robot 2 is moved in the work area 5 in order to convey the workpiece 50, the XY coordinate values of the position of the joint point J3 serve as a control target, and the position of the joint point J3 at the time of completion of the movement serves as a target position. In FIG. 6B, the angle formed by the third arm 13 and the hand 14 is an angle Sj of the hand 14, but the angle Sj is a joint angle represented by the joint coordinates.

In the robot 2, the motors 21 to 23 drive the arms 11 to 13, respectively, so that the position of the joint point J3, that is, the XY coordinate values can be changed. However, while the XY coordinate values are two dimensional values, the angles TH1 to TH3, joint angle, can be independently changed by the motors 21 to 23, respectively, and therefore the robot 2 has only one redundant freedom degree. Assuming that a position of the joint point J3 is given as a target position, there are innumerable postures of the arms 11 to 13 for realizing the target position. Depending on the posture to which each of the arms 11 to 13 moves, a large difference may occur in the movement time, or the arms 11 to 13 or the hand 14 may interfere with surrounding objects during the movement. When a target position is given and an optimum posture at that time is obtained without a constraint condition, a large amount of calculation is required. Therefore, in order to prevent the amount of calculation from increasing due to a redundant degree of freedom when the robot 2 is moved with the position of the joint point J3 as the target position, a virtual travel axis P which is a straight line passing through the origin is considered, and a condition that the joint point J2 which is a connection point of the second arm 12 and the third arm 13 is on the virtual travel axis P is added, and the movement of the robot 2 is controlled. The angle formed by the virtual travel axis P with respect to the X axis which is the reference direction of the robot 2 is defined as the virtual travel axis angle TW. When the virtual travel axis P and the position of the joint point J3 are given, in other words, when the virtual travel axis angle TW and the position of the joint point J3 are given, the postures of the arms 11 to 13 of the robot 2 are uniquely determined except for a difference between a left-handed system and a right-handed system described below. That is, the position of the joint point J3 as the target position in the XY coordinate system and the virtual travel axis angle TW at the end of the movement are given, so that the movement of the robot 2 can be controlled in one way. From the viewpoint of the posture that can be taken by the robot, the robot 1 illustrated in FIGS. 1A and 1B corresponds to a case where the virtual travel axis P always coincides with the X-axis which is the reference direction, in other words, a case where the virtual travel axis angle TW is fixed at 0°, in the robot 2.

Figure 6C:
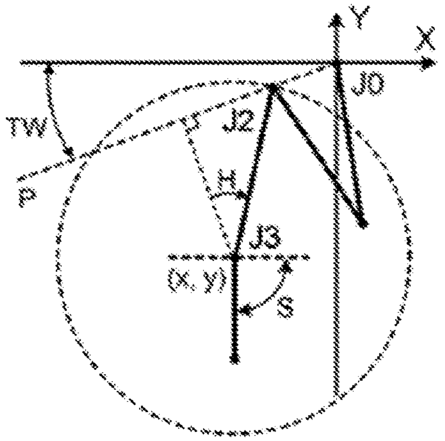
Figure 6D:
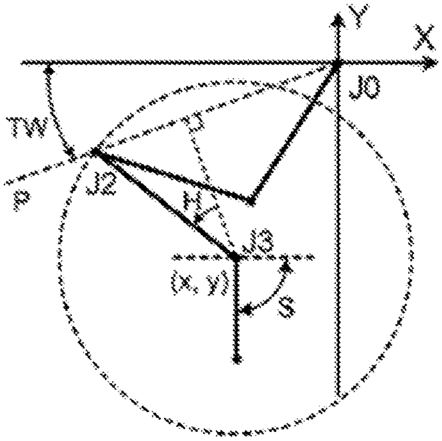

FIG. 6C and FIG. 6D are diagrams illustrating the difference between the left-handed system and the right-handed system. FIG. 6C illustrates the left-handed system and FIG. 6D illustrates the right-handed system, assuming that the positions (X, Y) of the joint point J3 are the same. The reason why the left-handed system and the right-handed system are generated is that there are generally two points at which a circle having the joint point J3 as its center and the effective length L3 of the third arm 13 as its radius intersects with the virtual travel axis P. When a perpendicular line is drawn from the joint point J3 to the virtual travel axis P and the angle H formed by this perpendicular line and the third arm 13 around the joint point J3 is measured from the perpendicular line side, in a case of $H<0$ (i.e., in a case where the joint point J2 is on the right side with respect to the foot of the perpendicular line), the system is the left-handed system, and conversely, in a case where the joint point is $H\geq 0$, the system is the right-handed system. The orientation of the hand 14 in the XY coordinate system is determined by the access direction with respect to the stage regardless of the orientation of the third arm 13, and therefore the angle formed by the positive direction of the X-axis and the hand 14 around the joint point J3 is defined as an angle S of the hand 14 in FIG. 6C and FIG. 6D. The angle S is a joint angle represented by the XY coordinate system.

Figure 6E:
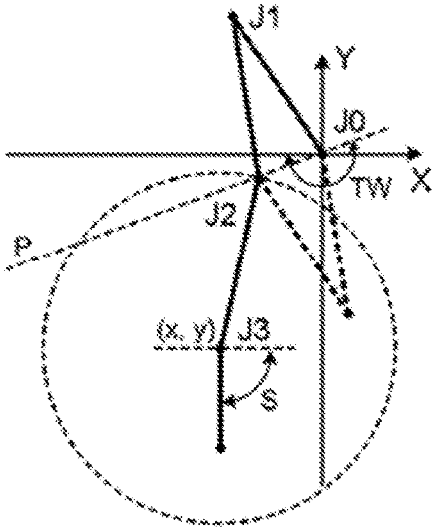
Figure 6F:
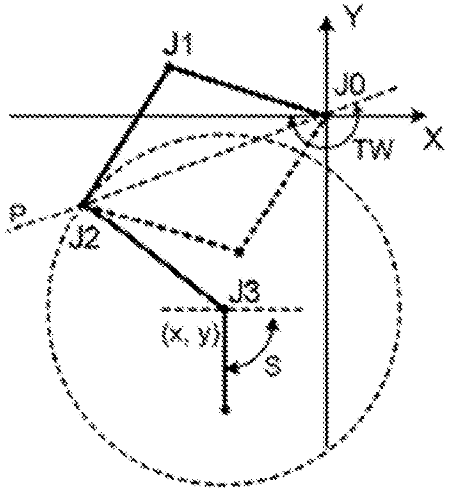

FIG. 6E illustrates a posture in which the first arm 11 and the second arm 12 in the posture illustrated in FIG. 6C are arranged at symmetrical positions with respect to the virtual travel axis P. Even in the posture illustrated in FIG. 6E, the joint point J2 is on the virtual travel axis P, but it is different whether the joint point J1 is on the right side or on the left side with respect to the virtual travel axis P when viewed from the origin toward the joint point J3. Such a difference is not classified into the difference between the left-hand system and the right-hand system, but is treated as a difference caused by the fact that the virtual travel axis angle TW formed by the X-axis direction and the virtual travel axis P is different from that illustrated in FIG. 6C by 180°. In order to express such a difference, the virtual travel axis angle TW is defined within a range of −180°TW≤180°. Similarly, FIG. 6F illustrates a posture in which the first arm 11 and the second arm 12 in the posture illustrated in FIG. 6D are arranged at symmetrical positions with respect to the virtual travel axis P, and FIG. 6D and FIG. 6F are treated as if the virtual travel axis angle TW is different by 180°.

Consequently, when the robot 2 is moved from the position before the movement to the target position, the position (X, Y) of the joint point J3 is used as the position of the robot 2, the virtual travel axis angle TW before the movement and the virtual travel axis angle TW after the movement are designated, and the motors 21 to 24 of the respective axes of the robot 2 can be controlled. Note that the virtual travel axis angle TW before the movement may be different from the virtual travel axis angle TW after the end of the movement, and when the virtual travel axis angle TW is different before and after the movement, the virtual travel axis angle TW changes during the movement. When a series of conveyance operation is actually performed by the robot 2, the origin position illustrated in FIG. 6A is given as an initial position, and the robot 2 is sequentially moved from this initial position. The joint point J0 and the joint point J2 overlap with each other at the origin position, and therefore the virtual travel axis P cannot be uniquely determined. However, in the case of the origin position, the virtual travel axis angle TW is defined as 0°.

When the robot 2 is moved by the PTP operation, in a case where the position before the movement, the target position (x, y), and the virtual travel axis angles TW before and after the movement are given, the rotation amount (movement amount) required for each of the motors 21 to 24 is calculated, and the operation plan is created on the assumption that the motors 21 to 24 of the respective axes simultaneously start rotation and simultaneously stop rotation. Then, by executing the above-described resonance avoidance processing on at least one axis and recreating the operation plan in the same manner as described above, the occurrence of resonance in the robot 2 can be suppressed.

Even when the robot 2 is moved by the linear interpolation operation, the maximum speed V0 in the operation plan for a certain axis is obtained to determine whether or not the speed V0 is within the resonance avoidance speed range of that axis, and when the speed V0 is within the resonance avoidance speed range, the operation plan is regenerated such that the maximum speed V1 becomes equal to or lower than the lower limit speed LL of the resonance avoidance speed range. Since the robot 2 has a redundant degree of freedom, even when the maximum speed V0 in the original operation plan is within the resonance avoidance speed range for the axis of interest, it is possible to generate an operation plan in which the maximum speed of the axis of interest is equal to or lower than the lower limit speed LL of the resonance avoidance speed range by moving other axes without collectively reducing the speeds of all the axes. Such control for suppressing the occurrence of resonance will be described below.

Figure 7:
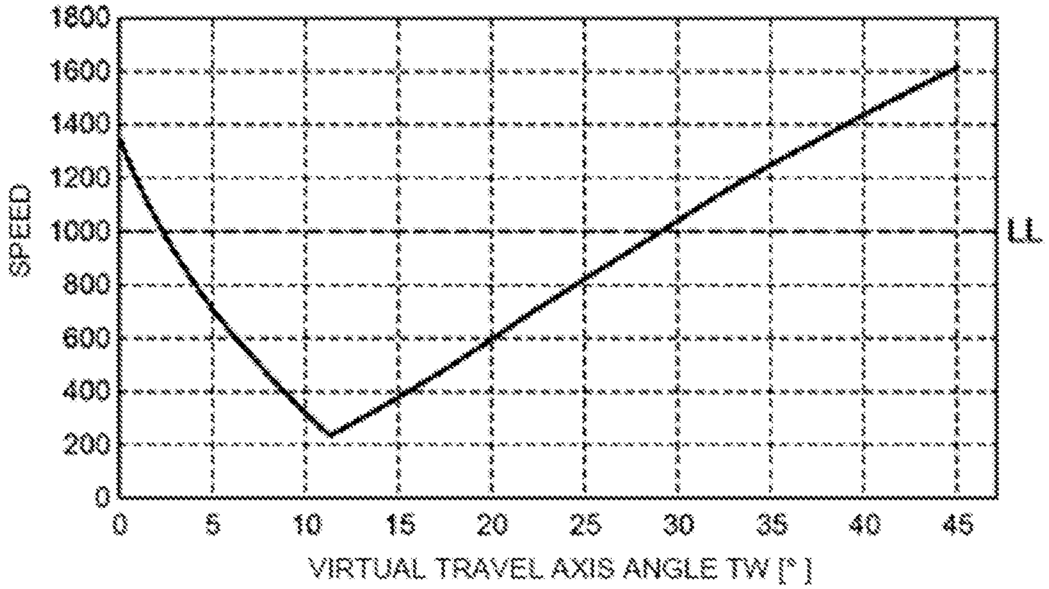
FIG. 7 is a graph illustrating an example of a relationship between a virtual travel axis angle TW and the maximum speed.

FIG. 7 illustrates how the maximum speed of the motor 21 that drives the axis of the joint point J0 (the speed of change in the angle TH1) changes depending on the virtual travel axis angle TW when the robot 2 is driven so as to move the distal end of the hand 14 at a predetermined speed with a predetermined acceleration time and deceleration time while fixing the start point and end point when moving the joint point J3. The speed is indicated by a unit used in the robot control device 30. Here, it is assumed that the lower limit speed LL of the resonance avoidance speed range is 1000. Then, it can be seen that by setting 2.4°≤TW≤28.9°, the maximum speed at the axis of j oint point J0 can be set to be equal to or lower than the lower limit speed LL of the resonance avoidance speed range without decreasing the overall speed. The overall speed is the speed of the robot as a whole when the robot reaches the target position based on the operation plan. In general, the robot control device 30 is provided with a function of arbitrarily setting the overall speed of the robot between 0 to 100%, with the overall speed in the given operation plan as 100%, in order to move the robot as a whole at a low speed at the time of teaching or the like. When the robot has a redundant degree of freedom, the speed can be distributed among the axes when the robot reaches the same target position. Therefore, by changing the speed distribution ratio among the axes while maintaining the overall speed, the speed of a specific axis can be reduced when the robot reaches the same target position.

Figure 8:
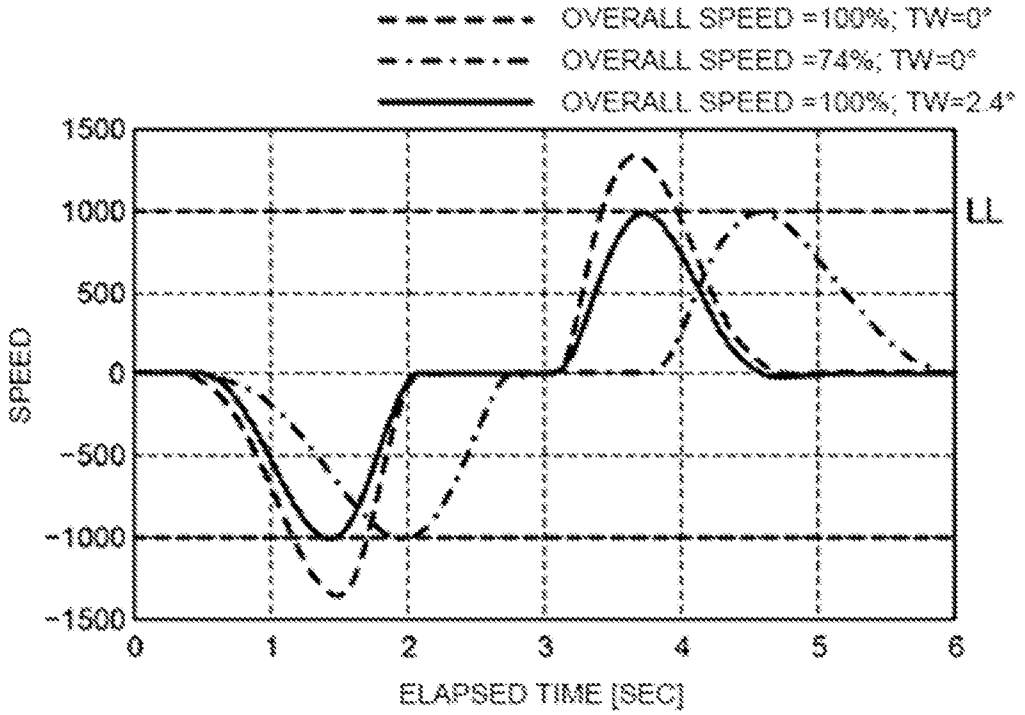
FIG. 8 is a diagram for explaining recreation of an operation plan by changing the virtual travel axis angle TW.

FIG. 8 illustrates the temporal change in the speed of the axis of the joint point J0 when the robot 2 is driven under the same conditions as in FIG. 7. When the virtual travel axis angle TW is 0°, the time to completion of the movement is 5 seconds when the overall speed is 100%, but the speed of the axis is equal to or higher than the lower limit speed LL of the resonance avoidance speed range during the elapsed time from about 3.4 seconds to about 4.0 seconds in the positive direction of rotation (i.e., a positive speed region when the speed has positive and negative values). In order to avoid the occurrence of the resonance while keeping the virtual travel axis angle TW at 0°, it is necessary to lower the overall speed to 74%. In this case, the time to completion of the movement is 6 seconds, which is longer by 1 second than the time when the overall speed is 100%. On the other hand, when the virtual travel axis angle TW is set to 2.4°, the maximum speed can be set to be equal to or lower than the lower limit speed LL of the resonance avoidance speed range while the overall speed remains 100%, and the time to completion of the movement remains 5 seconds.

Figure 9A:
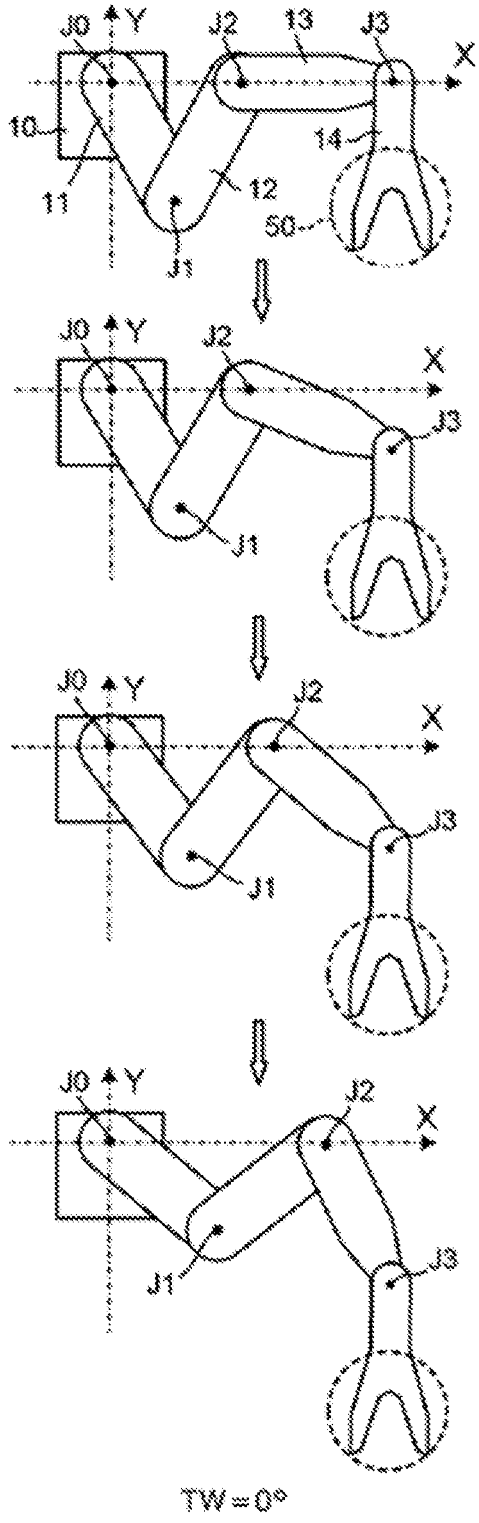
FIGS. 9A and 9B are schematic plan views each illustrating movements of the robot in a linear interpolation operation.
Figure 9B:
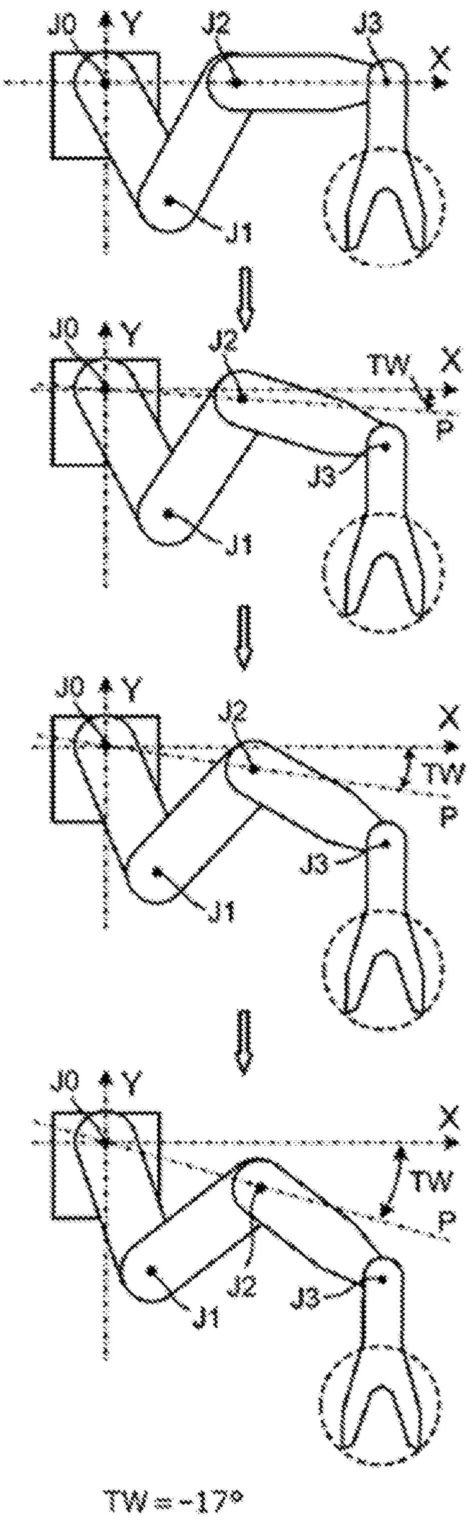

Since the virtual travel axis angle TW depends on the posture of the robot 2, the virtual travel axis angle TW at the start of movement may not be an angle suitable for suppressing the occurrence of resonance without decreasing the overall speed (e.g., TW=0° in the example illustrated in FIG. 8), but even in such a case, the occurrence of resonance can be suppressed without reducing the overall speed by performing control to change the virtual travel axis angle TW during the movement of the robot 2. FIGS. 9A and 9B are diagrams each for explaining the posture of the robot 2 when the virtual travel axis angle TW is changed during the movement based on the linear interpolation operation. FIGS. 9A and 9B each illustrate the movements of the arms 11 to 13 and the hand 14 as a plan view when the robot 2 is moved from a posture in which the joint point J2 is on the X-axis (i.e., TW=0°) and the joint point J3 is also on the X-axis before the movement so that the position of the joint point J3 is moved in the −Y direction by a certain distance by the linear interpolation operation. In the movement, the angle S, which is the joint angle of the hand 14 in the XY coordinate system, remains constant at −90°. FIG. 9A sequentially illustrates the movement in the linear interpolation operation when the virtual travel axis angle TW is set to 0° (when the robot is moved in the same manner as the robot 1 illustrated in FIGS. 1A and 1B), and FIG. 9B sequentially illustrates the movement in the linear interpolation operation when the virtual travel axis angle TW after the movement of the robot 2 illustrated in FIG. 6 is set to −17°. Even in a case where the occurrence of the resonance is not avoided, the time to completion of the movement is shorter when the virtual travel axis angle TW is changed from 0° during the movement as illustrated in FIG. 9B than when the virtual travel axis angle TW is fixed to 0° as illustrated in FIG. 9A. Considering that the resonance avoidance processing is executed, when the virtual travel axis angle is fixed, it is necessary to suppress the occurrence of resonance by reducing the overall speed, and the time to completion of movement increases. However, in the case where the virtual travel axis angle TW can be changed, by changing the virtual travel axis angle during the movement, it is possible to suppress the occurrence of resonance while suppressing the increase in the time to completion of the movement. Therefore, by executing the control for changing the virtual travel axis angle TW, it is possible to shorten the time to completion of the movement while suppressing the occurrence of resonance, as compared with the case where the virtual travel axis angle TW is fixed.

As described above, in the embodiment, by using the redundant degree of freedom of the robot 2, it is possible to suppress the occurrence of resonance while suppressing an increase in the time to completion of movement.

What is claimed is:

1. A control method of creating an operation plan of a robot which is a horizontal articulated robot, based on an operation command to the robot, thereby controlling a motor of each of axes of the robot, the control method comprising:

before driving the robot based on the operation plan, setting in advance, with respect to a speed of the motor for each axis of the robot, a resonance avoidance speed range corresponding to a natural vibration frequency of the robot defined by a lower limit speed and an upper limit speed at which resonance is expected to occur;

acquiring a maximum speed of the motor of each of axes of the robot in the operation plan; and in response to determining that the maximum speed of at least one axis driven by the motor in the robot in the operation plan is included in the resonance avoidance speed range, executing resonance avoidance processing of recreating the operation plan such that the maximum speed is equal to or lower than a lower limit speed of the resonance avoidance speed range.

2. The control method according to claim 1, wherein the robot comprises a coupled body in which a plurality of arms are coupled in series, a base to which the coupled body is connected at one end of the coupled body, and a hand attached to an other end of the coupled body, and the resonance avoidance processing is executed on an axis, among the axes, which is at a position where the base and the coupled body are connected.

3. The control method according to claim 2, wherein a number of degrees of freedom of the coupled body in a horizontal plane is two, and a highest speed of each of the axes is reduced when the operation plan is recreated.

4. The control method according to claim 3, wherein the operation plan created based on the operation command is an operation plan based on a point-to-point operation in which timings of acceleration start, acceleration end, deceleration start, and deceleration end coincide in all the axes of the robot.

5. The control method according to claim 2, wherein the operation plan created based on the operation command is an operation plan based on a point-to-point operation in which timings of acceleration start, acceleration end, deceleration start, and deceleration end coincide in all the axes of the robot.

6. The control method according to claim 2, wherein a number of degrees of freedom of the coupled body in a horizontal plane is three or more, the operation plan created based on the operation command is a control plan based on a linear interpolation operation, and an operation plan in which an overall speed is maintained is created when the operation plan is recreated.

7. The control method according to claim 6, wherein the plurality of arms comprises a first arm rotatably connected to the base, a second arm rotatably connected to the first arm, and a third arm rotatably connected to the second arm and rotatably holding the hand, wherein a position where the first arm is connected to the base is set as an origin, a position where the second arm is connected to the first arm is set as a first joint point, a position where the third arm is connected to the second arm is set as a second joint point, and a position where the hand is connected to the third arm is set as a third joint point, and that the second joint point exists on a virtual travel axis passing through the origin in a horizontal plane, and an angle formed by a reference direction extending horizontally through the origin and the virtual travel axis is set as a virtual travel axis angle, an operation plan for changing the virtual travel axis angle during movement is created when the operation plan is regenerated.

8. A robot control device connected to a robot via a cable that creates an operation plan of the robot which is a horizontal articulated robot, based on an operation command to the robot, thereby controlling a motor of each of axes of the robot, wherein before driving the robot based on the operation plan, the robot control device sets in advance, with respect to a speed of the motor for each axis of the robot, a resonance avoidance speed range corresponding to a natural vibration frequency of the robot defined by a lower limit speed and an upper limit speed at which resonance is expected to occur;

the robot control device acquires a maximum speed of the motor of each of axes of the robot in the operation plan; and in response to determining that the maximum speed of at least one axis driven by the motor in the robot in the operation plan is included in the resonance avoidance speed range, the robot control device recreates the operation plan such that the maximum speed is equal to or lower than a lower limit speed of the resonance avoidance speed range.

* * * * *